United States Patent
Marold

(10) Patent No.: US 6,927,376 B2
(45) Date of Patent: Aug. 9, 2005

(54) AUTOFOCUSING METHOD FOR TELESCOPES PERTAINING TO SURVEYING EQUIPMENT

(75) Inventor: Thomas Marold, Jena (DE)

(73) Assignee: Trimble Jena GmbH (DE)

( * ) Notice: Subject to any disclaimer, the term of this patent is extended or adjusted under 35 U.S.C. 154(b) by 174 days.

(21) Appl. No.: 10/070,580

(22) PCT Filed: Jul. 10, 2001

(86) PCT No.: PCT/EP01/07931
§ 371 (c)(1), (2), (4) Date: Aug. 9, 2002

(87) PCT Pub. No.: WO02/05005
PCT Pub. Date: Jan. 17, 2002

(65) Prior Publication Data
US 2003/0089837 A1 May 15, 2003

(30) Foreign Application Priority Data
Jul. 10, 2000 (DE) .......................... 100 33 483

(51) Int. Cl.⁷ ............................................ G02B 27/64
(52) U.S. Cl. .............................. 250/201.7; 250/201.8; 348/349; 348/353; 348/356; 382/255
(58) Field of Search .......................... 250/201.2–201.8; 348/345, 349–356; 382/168, 255

(56) References Cited

U.S. PATENT DOCUMENTS

| | | | |
|---|---|---|---|
| 3,938,893 A | | 2/1976 | Nanba et al. ............... 356/125 |
| 4,371,866 A | * | 2/1983 | Smith .......................... 382/266 |
| 4,639,587 A | | 1/1987 | Chadwick et al. ........ 250/201.3 |
| 4,677,286 A | | 6/1987 | Liu ........................... 250/201.3 |
| 4,725,722 A | | 2/1988 | Maeda et al. ............... 356/624 |
| 4,945,220 A | * | 7/1990 | Mallory et al. ........... 250/201.3 |
| 5,732,292 A | * | 3/1998 | Yaji .............................. 396/128 |
| 5,802,206 A | * | 9/1998 | Marold ........................ 382/199 |
| 6,700,615 B1 | * | 3/2004 | Satoh .......................... 348/345 |

FOREIGN PATENT DOCUMENTS

| | | |
|---|---|---|
| DE | 3636951 A1 | 6/1987 |
| DE | 3810882 A1 | 10/1988 |
| DE | 195 00 817 C1 | 1/1995 |
| DE | 195 49 048 A1 | 12/1995 |
| DE | 196 14 235 A1 | 4/1996 |
| DE | 100 33 483 C1 | 7/2000 |
| EP | 0144732 B1 | 6/1989 |
| EP | 0 459 004 A1 | 12/1991 |
| GB | 2 003 692 A | 3/1979 |
| JP | 56016806 | 2/1981 |

\* cited by examiner

Primary Examiner—Thanh X. Luu
Assistant Examiner—Stephen Yam
(74) Attorney, Agent, or Firm—Eugene E. Renz, Jr.

(57) ABSTRACT

The invention relates to an autofocusing method, particularly for telescopes for surveying instruments which are fitted with image sensors that resolve the image signal into individual image elements (pixels), such as CCD lines and/or matrices as well as CMOS image sensors. On the basis of the pixel that is located closest to the optical axis, the local signal amplitude is calculated from the monotonically decreasing or increasing signal all the way to the next local maximum and minimum. In this process, as long as this local signal amplitude is considerably smaller than the maximum signal and the focusing member of the telescope lens is in the focusing position for short focusing distances, this focusing member is shifted in large increments. Depending on the magnitude of the local signal amplitude, the focusing distance is shortened in the area of greater focusing distances in relation to the maximum signal and to the position of the focusing member. At a certain magnitude of the local signal amplitude in relation to the maximum signal, the cross correlation functions (CCF) are each additionally formed from several pixels of the signal and from suitable comparison structures and, at a certain ratio of a reference function formed on the basis of the CCF to the local signal amplitude, an increment range that is comparable to the optical depth of field is selected and focused to the maximum of the CCF.

5 Claims, 5 Drawing Sheets

AUTOFOCUSING METHOD FOR TELESCOPES PERTAINING TO SURVEYING EQUIPMENT

FIELD OF THE INVENTION

The invention relates to an autofocusing method, particularly for telescopes of surveying instruments, and it is suitable for image sensors that resolve the image signal into individual image elements (pixels), such as CCD lines and matrices as well as CMOS image sensors.

STATE OF THE ART

Autofocusing systems for surveying instruments are already known. German Preliminary Published Application DE-OS 196 14 235 describes an autofocus for a level. Here, an additional optical system located behind the focal plane serves to detect the sharp setting by means of two imaging lenses that generate object images on two line sensors. Moreover, means to detect the focusing lens position are necessary.

German Preliminary Published Application DE-OS 195 49 048 should be seen in this context; by means of a beam splitter, a plane is generated that is equivalent to the focal plane for the focus detection system. This approach has the disadvantage that it cannot be easily transferred to a digital level.

German patent no. 34 24 806 as well as the publication title "Zeitschrift für Vermes-sungswesen und Raumordnung" [Journal of surveying technology and area planning], April 1995, pages 65 to 78, disclose the use of beam splitters in order to generate a second focal plane for the CCD line needed for the evaluation. An additional autofocus optical system would then require a third equivalent focal plane if the telescope should continue to be used for visual observations.

European patent EP 576,004 discloses a digital level with an autofocus in which focusing takes place at a maximum amplitude—measured or else calculated by means of linear interpolation—of the Fourier transforms of the detector signal in a coarse and fine increment raster. This approach is likewise problematic. Depending on the focusing distance, the Fourier transformation of a survey image can lead to differing results if, as is necessary for digital leveling, the scanning theorem cannot be observed for all of the leveling rod markings that are present along the entire range of the focusing distance.

Japanese Preliminary Published Application JP-OS 4-93 711 comprises an autofocus for a CCD camera that is connected via a tachymeter telescope to a beam splitter. A focusing lens is adjusted by a motor in such a way that the image size of the imaged object is minimal. This approach likewise does not necessarily ensure optimal image sharpness since the minimum can be relatively wide and therefore hard to detect.

U.S. Pat. No. 5,481,329 describes an autofocusing device with an additional imaging after the focal plane on four sensors and with a correlation of the images formed on the opposite side. The sum of differences between adjacent pixels is taken as the contrast value. Depending on the outcome, additional filters are available for other spatial frequencies. Depending on whether an object generates a high-contrast or a low-contrast image, the DC component is removed completely or partially. The disadvantageous and complex aspect of this arrangement is the additional optical system that is needed.

U.S. Pat. No. 5,715,483 discloses the technique of first carrying out measurements in large increments over the entire focusing range whereby the maximum of the output signal of a broad-band filter is employed as the criterion. Then, in a second step, smaller increments are used to search within a smaller range around the value of the maximum using a high-pass filter as the criterion. This is done in order to prevent secondary maxima of a function that is relevant for the autofocus from giving rise to an incorrect adjustment of the focus. This approach likewise entails drawbacks. For instance, it is first necessary to focus over the entire range in order to find a maximum through the use of a broad-band filter. If no maximum can be found in this manner, a low-pass filter has to be used instead of a high-pass filter in the second step. The entire procedure is impractical and complex.

It is common knowledge that the image contrast is at a maximum when the focusing is optimal. German patent DE 195 00 817 also discloses the technique of using edges as objects of the greatest contrast in the image as a local maximum or minimum of the cross correlation function (CCF) of some pixels of the image content with an ideal edge.

DESCRIPTION OF THE INVENTION

The objective of the present invention is to eliminate the disadvantages of the state of the art to the greatest extent possible so as to obtain an autofocusing control signal and to determine the point (state) of optimal focusing of the telescope without using additional optical means and without having to necessarily pass through the entire focusing range.

According to the invention, this objective is achieved with the means indicated in the first patent claim. The subordinate claims present details and embodiments of the invention.

For example, in the case of two-dimensional image detectors, it is advantageous to perform the calculations in the direction of the rows, in the direction of the columns or else in both directions at the same time.

It is likewise advantageous if the focusing path until the next measurement is ascertained as the product resulting from the ratio of the maximum signal to the local signal amplitude, from the focus position relative to the position during focusing towards the infinite and from a constant.

Moreover, it can be an advantage to provide an ideal edge as the comparison structure for the cross correlation function. It is likewise advantageous if the reference function is the maximum of the cross correlation function.

BRIEF DESCRIPTION OF THE DRAWINGS

The invention will be elaborated upon below with reference to an embodiment example. The following is shown.

COMPREHENSIVE DESCRIPTION OF THE DRAWINGS

Figure 1:
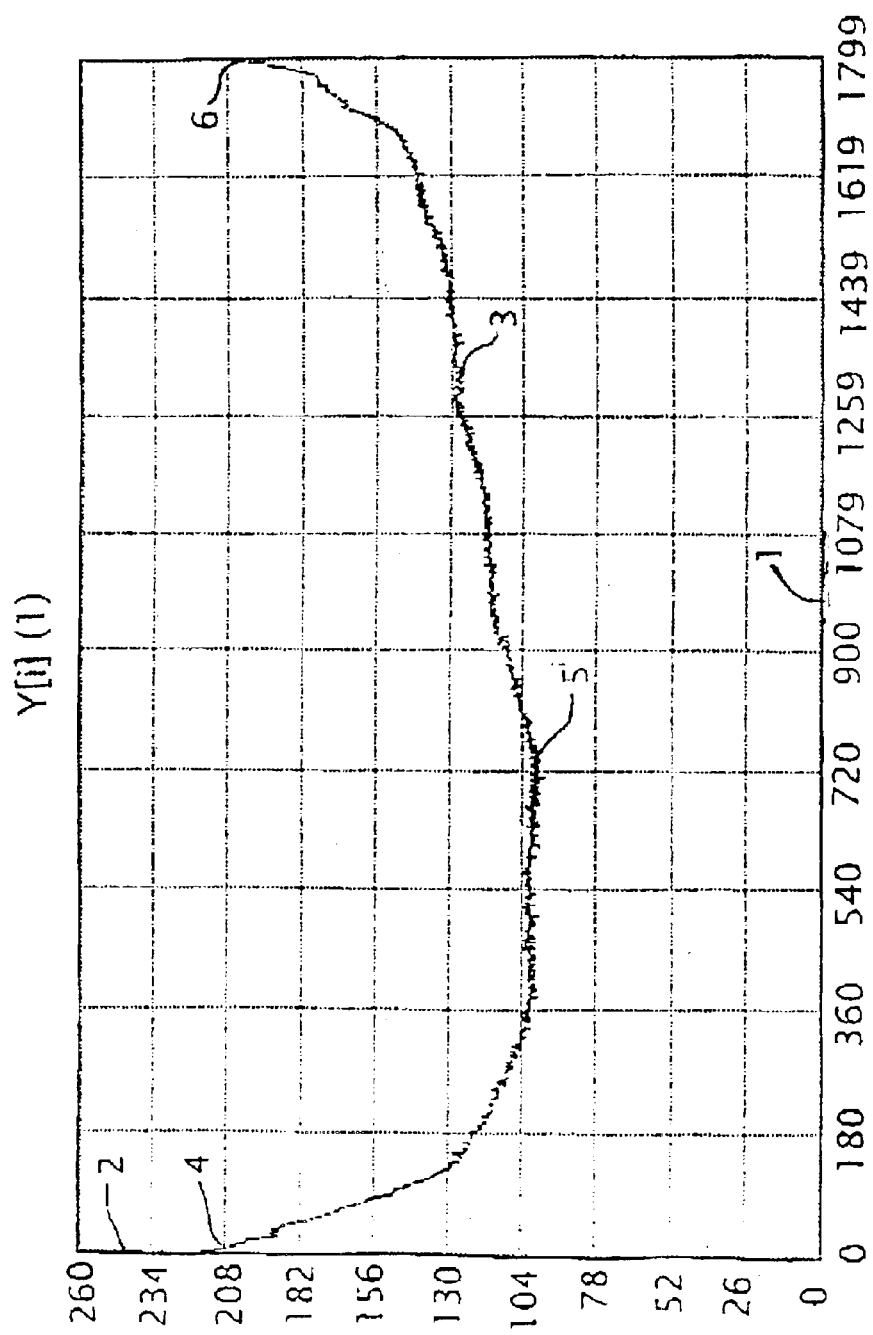
FIG. 1—the signal depiction of a CCD line in a completely defocused image.

FIG. 1 shows the survey image of the CCD line of a digital level with complete defocusing. The x axis 1 consecutively shows the pixel numbers i from 0 to 1799. The brightness of each pixel $Y_i$ is plotted in random units on the y axis 2. The value 255 means no signal (black) and the value 0 means maximum signal (white), thus resulting in a negative depiction. Therefore, the actual measurement curve 3 shows the brightness as a function of the pixel number $Y_1=f(i)$.

Due to the defocusing, only two essential features can be seen in FIG. 1. The function values at the line beginning 4 and at the line end 6 are rated here approximately as the dark signal $Y_D$ ($Y_i$ or $Y_{1799}=Y_D$).

Figure 2:
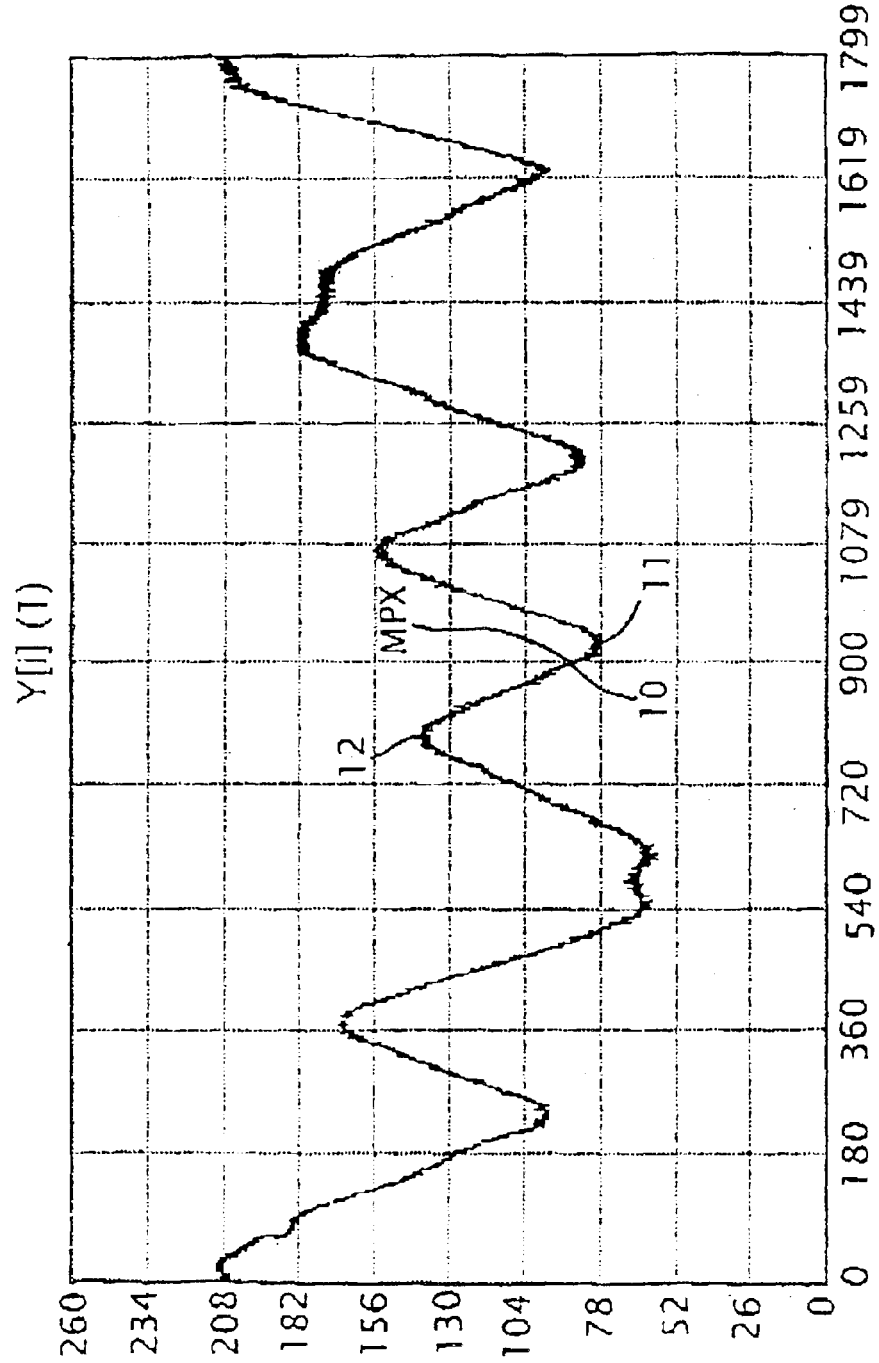
FIG. 2—the signal depiction of a CCD line in a defocused image but with the image content already recognizable.
Figure 3:
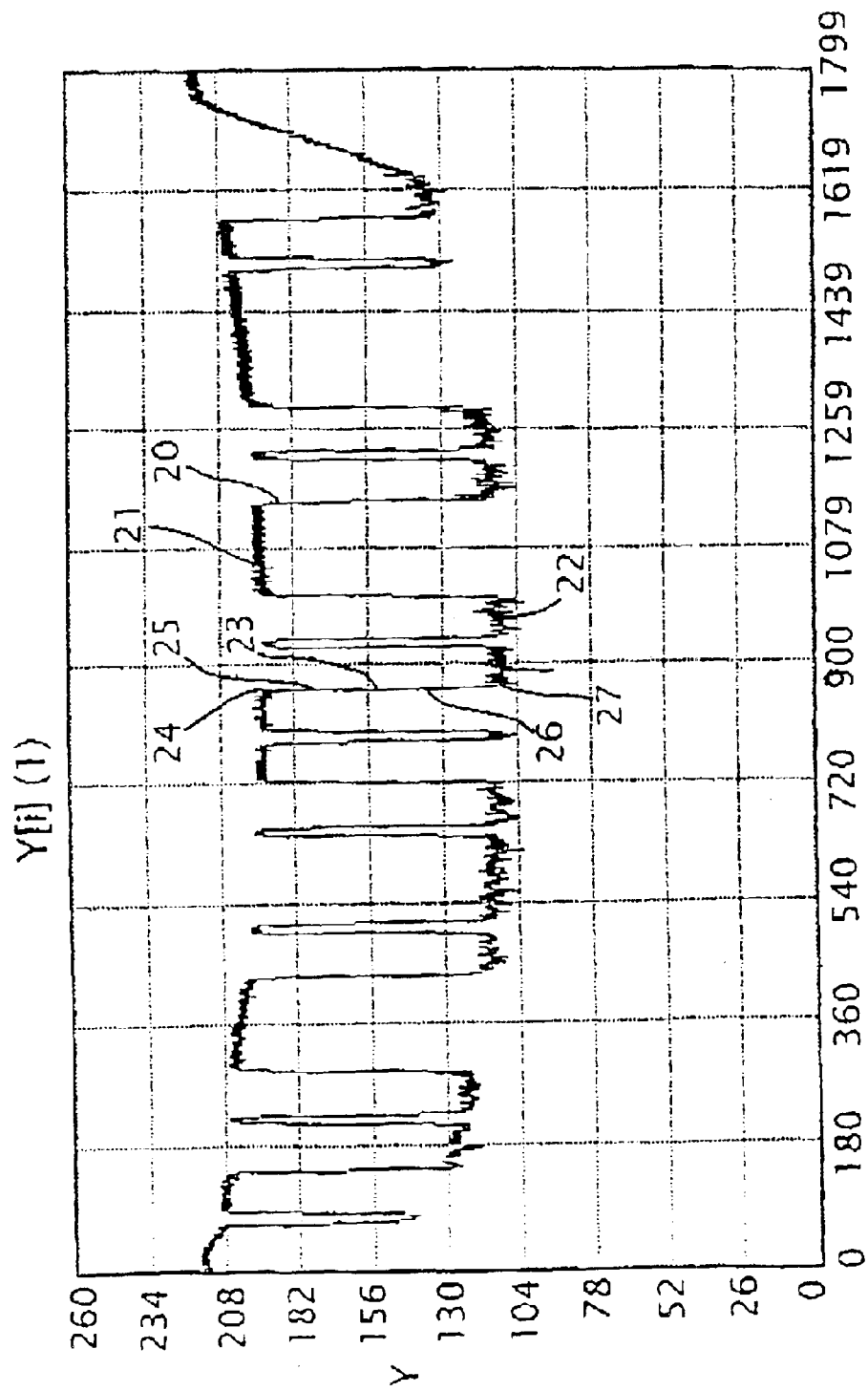
FIG. 3—the signal depiction of a CCD line in a focused image.

The survey images as shown in FIGS. 1 through 3 were taken with a digital level whose design only permits a small amount of light to reach the beginning or the end of the CCD line. Naturally, in principle, the dark signal can also be determined on the basis of a separate measurement. The second essential feature is the brightest point 5 in FIG. 1, $Y_{720}=Y_{min}$.

In this example, the brightest point occurs at pixel 720. The signal $Y_{min}$ is used for exposure control in a familiar manner. $Y_{min}$ has to be kept within certain limits. Thus, for instance, it cannot become zero since then the CCD line is overexposed.

The first essential value for the focusing that can be obtained from the survey image is the maximum signal $S_1$:

$$S_1 = Y_D - Y_{min} \quad (1)$$

It can be derived from FIG. 1 that $Y_D=210$ and $Y_{min}=100$. As a result, $S_1$ is 110. The acquisition of the second value on the basis of the survey image is then explained with reference to FIG. 2, which shows a signal depiction of a CCD line in a defocused image. A certain image content is already recognizable here. The pixel 10 on the curve that is located closest to the optical axis is the pixel i=900. It will be referred to below as the middle pixel (MPX). On the basis of MPX, the local signal amplitude $S_2$ is calculated from the monotonically decreasing or increasing signal all the way to the next local maximum $Y_{lmax}$ and minimum $Y_{lmin}$. For this purpose, starting with i=MPX, i is reduced until either a local maximum or a local minimum is reached so that the following prescriptions or rules are provided:

*i* starting at *i*=MPX decreasing in −1 increments, maximum *N* increments, as long as $Y_i \leq Y_{i+1}$, the last *i* results in $Y_{lmin}$     (2)

or

*i* starting at *i*=MPX decreasing in −1 increments, maximum *N* increments, as long as $Y_i \geq Y_{i+1}$, the last *i* results in $Y_{lmax}$.     (3)

Subsequently, i is increased starting from MPX, so that

*i* starting at *i*=MPX increasing in +1 increments, maximum *N* increments, as long as $Y_{i+1} \geq Y_i$, the last *i* results in $Y_{lmax}$     (4)

or

*i* starting at *i*=MPX increasing in +1 increments, maximum *N* increments, until $Y_{i+1} \leq Y_i$, the last *i* results in $Y_{lmin}$,     (5)

whereby for rules (4) or (5), only the appertaining inverse smaller or greater sign was evaluated, as realized in rule (2) or (3).

The number N over which the rules (2) through (5) can pass at the maximum results from half the structure width of the object to be focused at the shortest focusing distance. In this example, it is assumed that N=180. This value results from the structure widths of the imaged digital level measuring rod.

If, however, rules (2) through (5) result in a maximum or a minimum in both directions, then $Y_{MPX}=Y_{lmin}$ or $Y_{MPX}=Y_{lmax}$.

In a further refinement of rules (2) through (5), in order to suppress noise, another amplitude of approximately ±3 amplitude increments that differs locally from the monotonic sequence is permissible.

Then, the local signal amplitude results in the following:

$$S_2 = Y_{lmax} - Y_{lmin} \quad (6)$$

In FIG. 2, it is assumed that a pixel 12 is the one with the local maximum (lmax) at i=800 and a pixel 11 is the one with the local minimum (lmin) at i=950. The following holds true:
$Y_{lmax}=Y_{800}=140$
$Y_{lmin}=Y_{950}=80$
Thus, the result is $S_2=Y_{800}-Y_{950}=60$.

The first relationship (formula) for focusing is as follows:

Focusing path=$(S_1/S_2)$·focus position·constant     (7)

In this context, the following rules or determinations apply: $S_1/S_2$ is limited to a maximum value, for example, 4 in FIG. 4. Focus position normalized on the focusing path=1; infinite has the lowest value (=0).

In FIG. 1, $S_1=110$, $S_2=20$. Thus, $S_1/S_2=5.5$. If, for example, 0.05 is selected as the constant, at a focus position close to 1 (shortest focusing distance), these values allow a focusing path of 0.28 to be passed with the next increment.

In FIG. 2, $S_1=150$, $S_2=60$ and $S_1/S_2=2.5$. With the constant of 0.05 at a focus position close to 1 (shortest focusing distance), the result is a focusing path of 0.12 that can be passed with the next increment.

Figure 4:
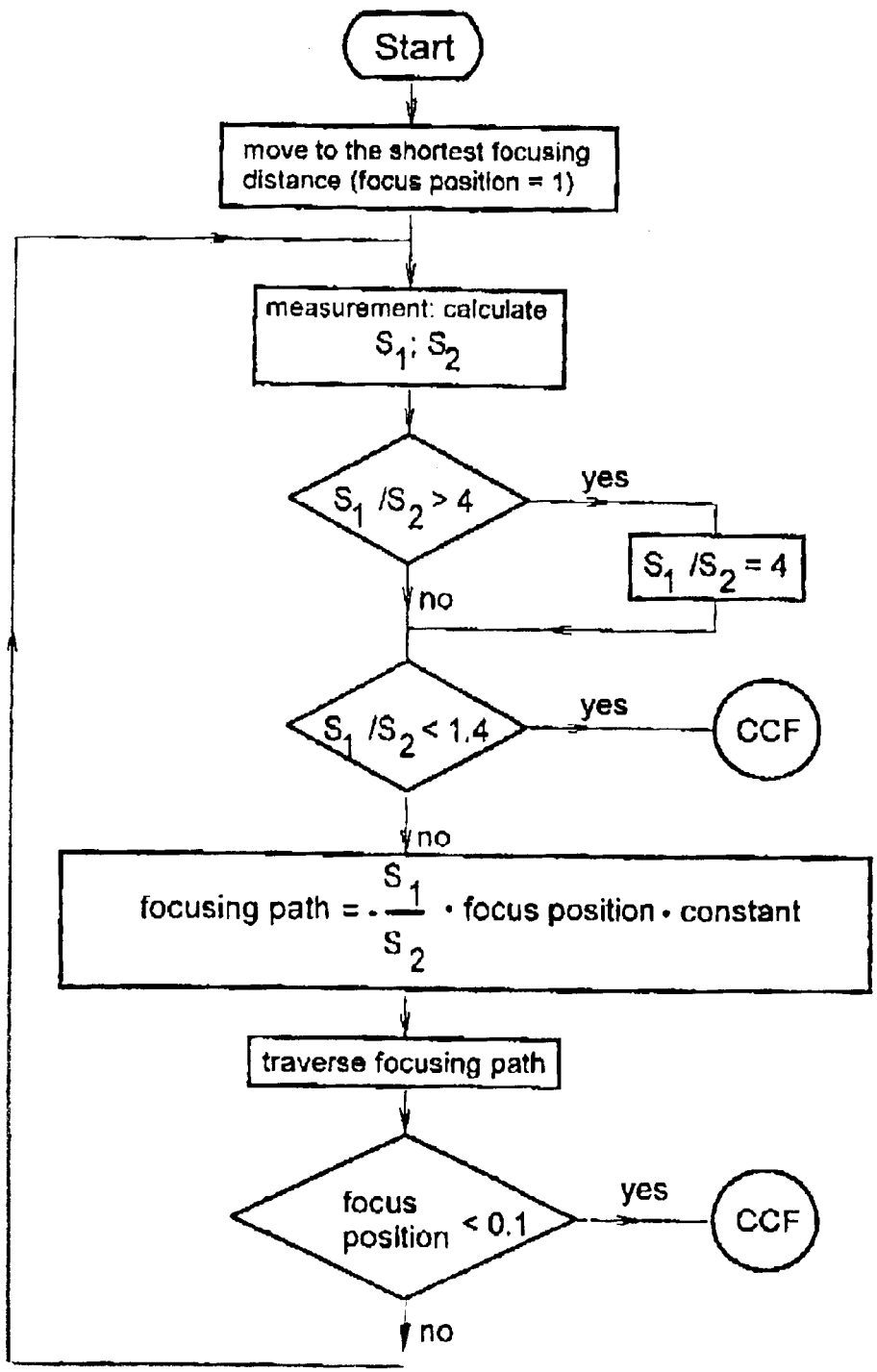
FIG. 4—a flowchart for the first part of the autofocus algorithm described in the example, and FIG. 5—a flowchart for the second part of the autofocus algorithm described in the example.

With a focusing position close to 0 (infinite), in spite of extreme defocusing, there is only a small possible value for the focusing path. In this context, it has been found that, by means of the criterion $S_1/S_2$, it can be decided as a function of the focusing distance whether a larger or a smaller focusing path can be traversed until the next measurement without passing the focus in the process. The appertaining flowchart is shown in FIG. 4.

The fact that it is not the signal amplitude but rather the ratio $S_1/S_2$ that goes into rule (7) has the advantage that rule (7) is independent of the amplitude. As a consequence, it can already be employed before an optimal exposure regulation has been made. Thus, the calculations and changes in the focus position of the members for the autofocus can already take place during the exposure regulation.

The method needed for the subsequent fine focusing as well as another calculation value used here are explained with reference to FIG. 3 which, in turn, shows the same object as in FIGS. 1 and 2, but in the focused state. The measurement curve 20 contains dark areas 21 and bright areas 22 which are separated by edges 23. The edges only encompass a few pixels of the image. The pixels 24, 25, 26 and 27 of edge 23 are drawn in FIG. 3.

The pixels 24 through 27 in this sequence have the following signals:
24: $Y_{860}=189$; 25: $Y_{861}=170$; 26: $Y_{862}=135$; and 27: $Y_{863}=115$.

The third function, which is essential for the focusing procedure, is the cross correlation function (CCF) consisting of four pixels and an ideal dark-bright edge having the signals (+1;+1;−1;−1).

It is formed according to the following equation:

$$CCF(i) = Y_i + Y_{i+1} - Y_{i+2} - Y_{i+3} \quad (8)$$

In the example of edge 23, this results in CCF(860)=109. The CCF is formed pixel-wise in the manner known from German patent DE 195 00 817. At places of a local maximum of this function, edges which lie in the range of pixels $Y_{i+1}$ and $Y_{i+2}$ appear in the survey image. The precise position is subsequently ascertained through interpolation.

For the focusing procedure, it is essential for the CCF to be a measure of the image contrast. On the basis of the CCF maxima, a reference function can be formed that can provide information about the focusing state. It is advantageous and simplest to use the maximum value of the CCF as the reference function in the entire image field. With somewhat more effort, the mean value from the local maxima of the CCF could likewise be used as the reference function. Hereinafter, the reference function thus formed will be designated as $CCF_{MAX}$.

The further course of the focusing procedure consists of maximizing the function $CCF_{MAX}/S_2$. It is practical, depending on the magnitude of the $CCF_{MAX}/S_2$ function, to adjust the focusing path either to the double depth of field, as long as $CCF_{MAX}/S_2$ is <0.5. If the value 0.5 is exceeded, the focusing path is then limited to the depth of field until the next measurement. The course of the focusing procedure is shown in FIG. 5 in the form of a flowchart.

In this context, the focusing path can be measured or else it can be set with sufficient precision without measurement by means of suitable regulation of the focusing motor, for example, a stepper motor.

In order to find the maximum of $CCF_{MAX}/S_2$, after it has been passed one time, it is normally sufficient to carry out three measurements in the vicinity of the maximum. In the simplest case, the maximum is the largest value of the $CCF_{MAX}/S_2$ of these three measurements. With somewhat more effort, the position of the maximum, also with a higher resolution, can be calculated on the basis of the three measured values, for instance, by means of parabolic interpolation. Such methods are common knowledge and therefore need not be elaborated upon here.

Figure 5:
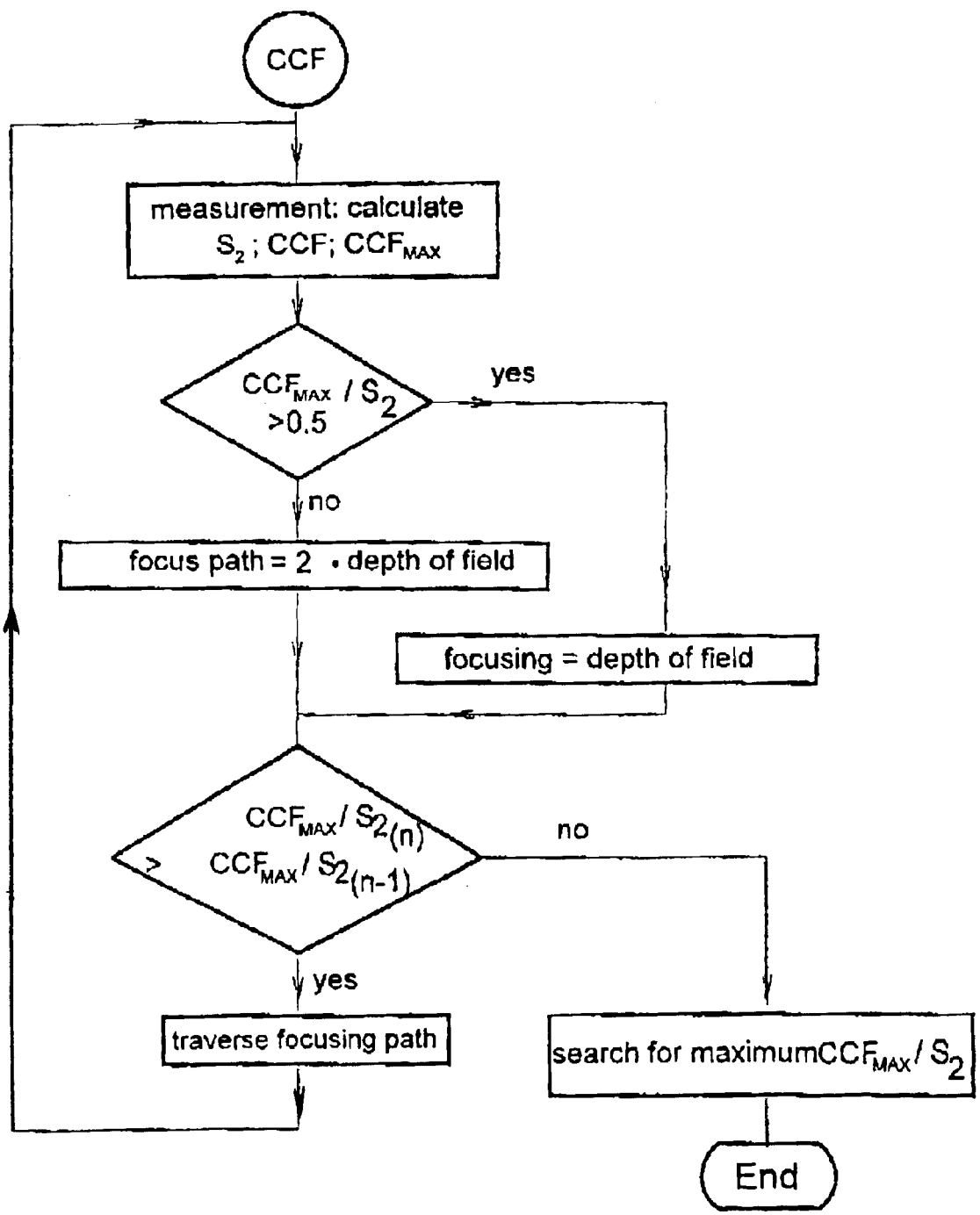

The rules that apply to the focusing are compiled in FIGS. 4 and 5. FIG. 4 shows that rule (7) is used either until the focus position is <0.1 or until $S_1/S_2$ falls below the value 1.4.

FIG. 5 shows that if one of the above-mentioned conditions is met, $CCF_{MAX}/S_2$ is formed. The increment range is limited to the depth of field as soon as $CCF_{MAX}/S_2>0.5$. This is then followed by traveling up to the maximum $CCF_{MAX}/S_2$.

The invention is not limited to the example given above. The constants selected for the decisions can assume other values that have been optimally adapted to the optical system in question. The increment ranges indicated in FIG. 5 for the focusing can also assume other values, such as the entire or half of the depth of field. Instead of CCF, another markedly contrast-dependent function can be likewise employed. It is also possible to use the function $CCF_{MAX}$ instead of $CCF_{MAX}/S_2$ as the criterion for the decision, except that then it must be ensured that the exposure no longer changes during the focusing procedure.

What is claimed:

1. A method for autofocusing an optical instrument, in particular a telescopes along an optical axis, said optical instrument having a focusing member and image sensors resolve the image signal into pixels, such as CCD lines and/or matrices as well as CMOS image sensors, characterized in that, on the basis of said pixel that is located closest to said optical axis, the local signal amplitude is calculated from the monotonically decreasing or increasing signal all the way to the next local maximum and minimum, as long as this local signal amplitude is considerably smaller than the maximum signal and said focusing member of the telescope lens is in the focusing position for short focusing distances, this focusing member is shifted in large increments, depending on the magnitude of the local signal amplitude, the focusing distance is shortened in the area of greater focusing distances in relation to the maximum signal and to the position of said focusing member, at a certain magnitude of the local signal amplitude in relation to the maximum signal, the cross correlation functions (CCF) are each additionally formed from several pixels of the signal and from suitable comparison structures, at a certain ratio of a reference function formed on the basis of the CCD to the local signal amplitude, an increment range that is comparable to the optical depth of field is selected and focused to the maximum of the CCF.

2. The method according to claim 1, characterized in that, for images of two dimensional image detectors, the calculations are performed in the direction of the rows, in the direction of the columns or else in both directions at the same time.

3. The method according to claim 1, characterized in that an idea edge is provided as the comparison structure for the cross correlation function (CCF).

4. A method of autofocusing along an optical axis a telescope for surveying instruments, said telescope having a focusing member and image sensors that resolve the image signal into pixels, such as a CCD lines and/or matrices as well as CMOS image sensors, characterized in that, on the basis of the pixel that is located closest to the optical axis, the local signal amplitude is calculated from the monotonically decreasing or increasing signal all the way to the next local maximum and minimum, as long as this local signal amplitude is considerable smaller than the maximum signal and the focusing member of the telescope lens is in the focusing position for short focusing distances, this focusing member is shifted in large increments, depending on the magnitude of the local signal amplitude, the focusing distance is shortened in the area of greater focusing distances in relation to the maximum signal and to the position of the focusing member, at a certain magnitude of the local signal amplitude in relation to the maximum signal, the cross correlation functions (CCF) are each additionally formed from several pixels of the signal and from suitable comparison structures, at a certain ratio of a reference function formed on the basis of the CCD to the local signal amplitude, an increment range that is comparable to the optical depth of field is selected and focused to the maximum of the CCF, and wherein the focusing path until the next measurement is determined as the product resulting from the ratio of the maximum signal to the local signal amplitude, from the focus position relative to the position during focusing towards the infinite and from a constant.

5. A method of autofocusing a telescope for surveying instruments, said telescope having a focusing member and image sensors that resolve the image signal into pixels, such as a CCD lines and/or matrices as well as CMOS image sensor, characterized in that, on the basis of the pixel that is located closest to the optical axis, the local signal amplitude is calculated from the monotonically decreasing or increasing signal all the way to the next local maximum and minimum, as long as the local signal amplitude is considerable smaller than the maximum signal and the focusing member of the telescope lens is in the focusing position for short focusing distances, this focusing member is shifted in large increments, depending on the magnitude of the local signal amplitude, the focusing distance is shortened in the area of greater focusing distances in relation to the maximum signal and to the position of the focusing member, at a certain magnitude of the local signal amplitude in relation to the maximum signal, the cross correction function (CCF) are each additionally formed from several pixels of the signal and from suitable comparison strictures, at a certain ratio of a reference function formed on the basis of the CCD to the local signal amplitude, an increment range that is comparable to the optical depth of field is selected and focused to the maximum of the CCF, and wherein the maximum of the CFF is employed as the reference function.

* * * * *